(No Model.) 7 Sheets—Sheet 1.
F. W. HOFELE.
Telescopic Ladder.
No. 232,968. Patented Oct. 5, 1880.
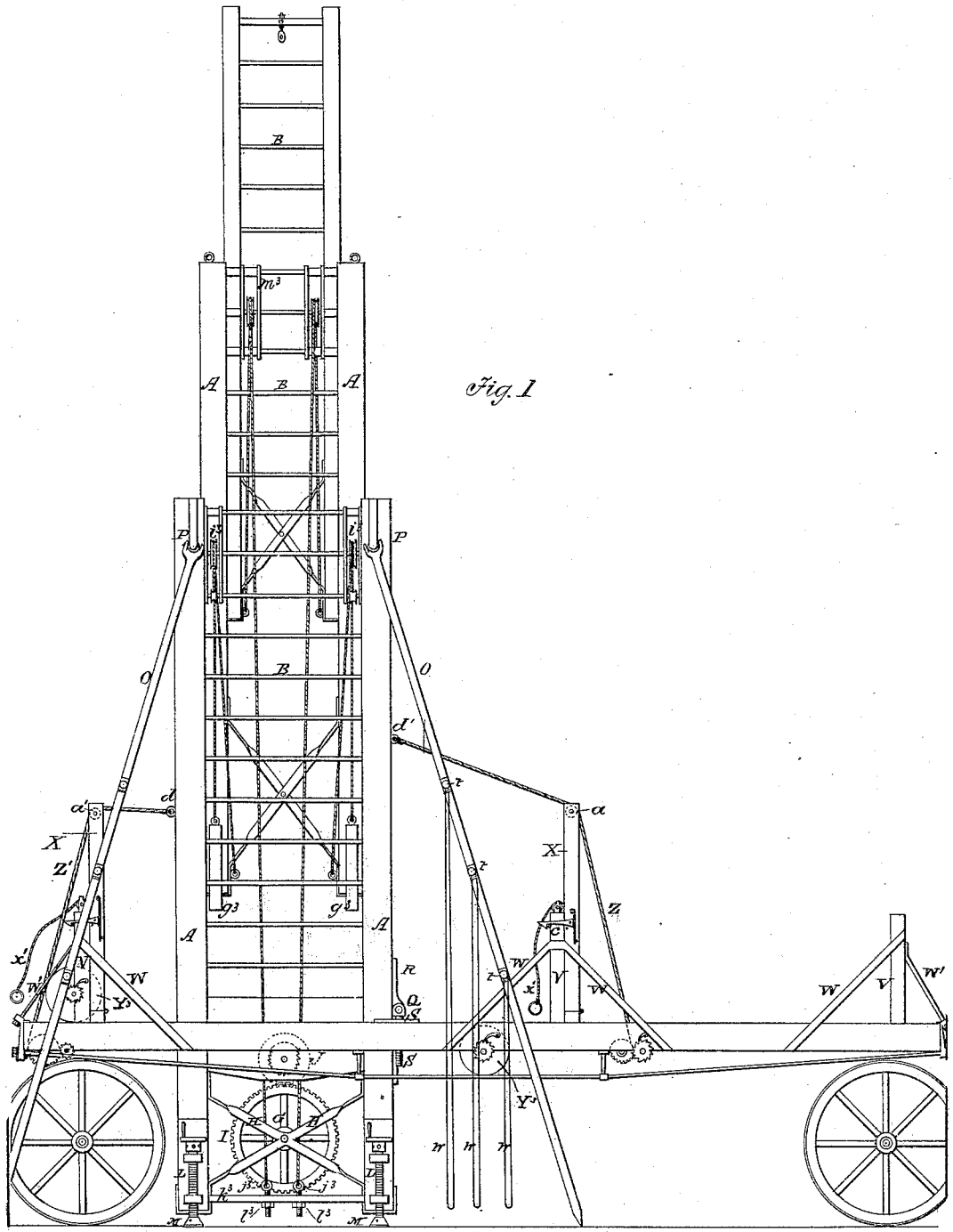
Witnesses:
T. J. W. Robertson
A. W. Robertson
Inventor
Ferdinand W. Hofele
per Charles H. Nash
Attorney

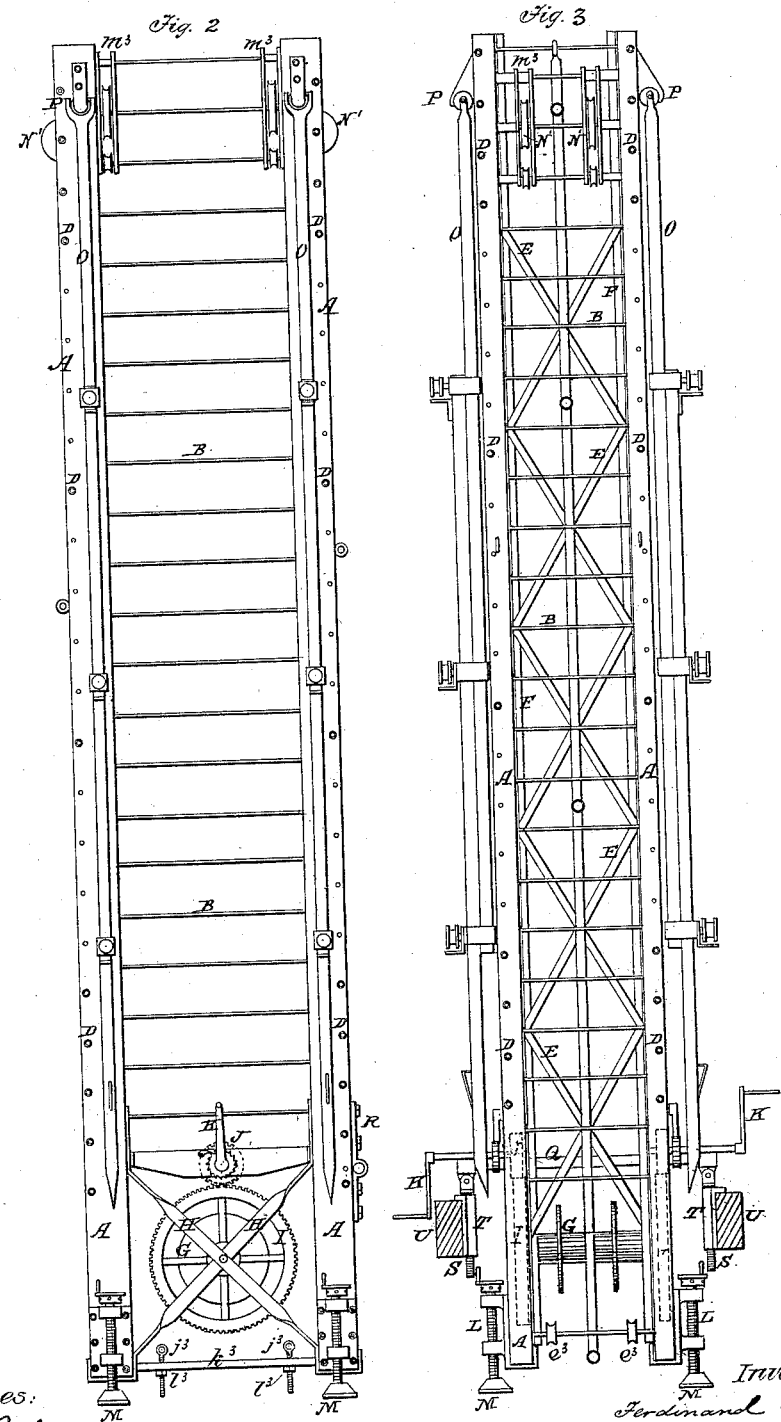

(No Model.)  7 Sheets—Sheet 3.
F. W. HOFELE.
Telescopic Ladder.
No. 232,968.  Patented Oct. 5, 1880.
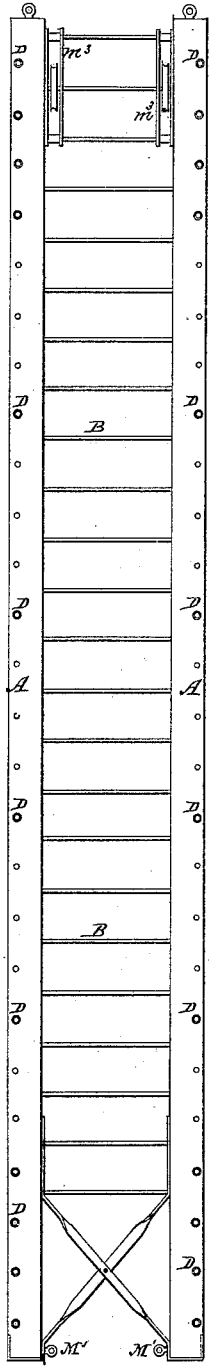
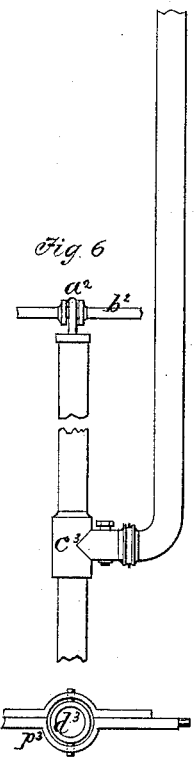
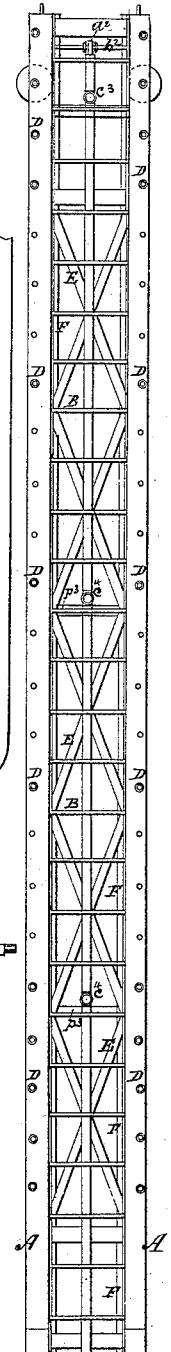
Witnesses:
T. W. Robertson
A. W. Robertson
Inventor
Ferdinand W. Hofele
per Charles N. Nash
Attorney (No Model.) 7 Sheets—Sheet 4.
F. W. HOFELE.
Telescopic Ladder.
No. 232,968. Patented Oct. 5, 1880.
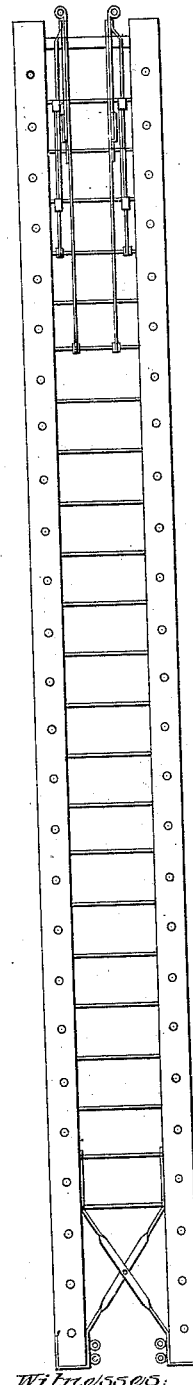
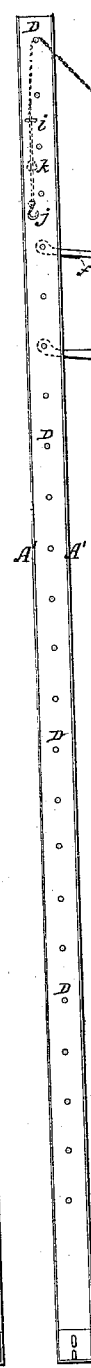
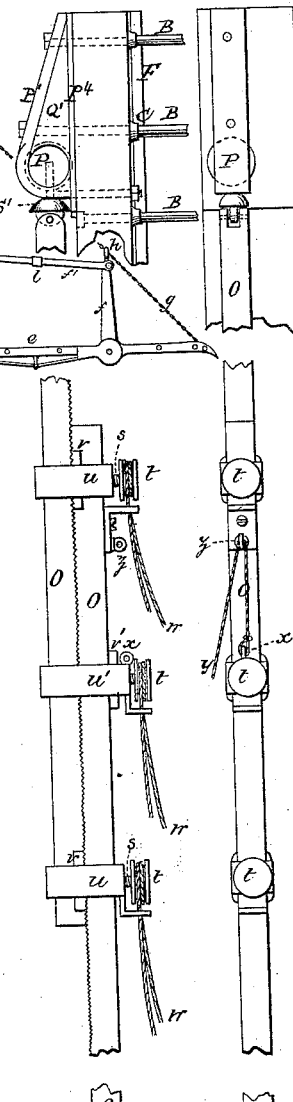
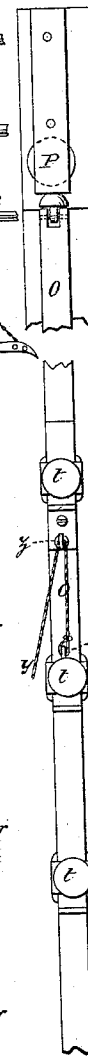
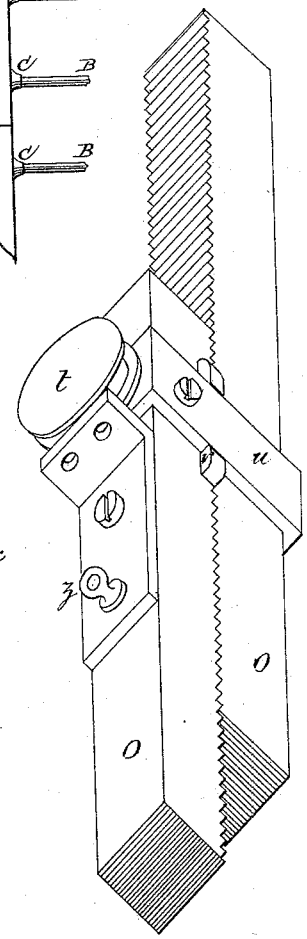
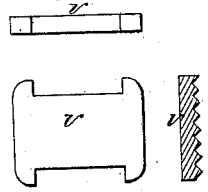
Witnesses:
T. J. W. Robertson
A. P. Robertson
Inventor
Ferdinand W. Hofele
per Charles H. Nash
attorney (No Model.) 7 Sheets—Sheet 5.
F. W. HOFELE.
Telescopic Ladder.
No. 232,968. Patented Oct. 5, 1880.
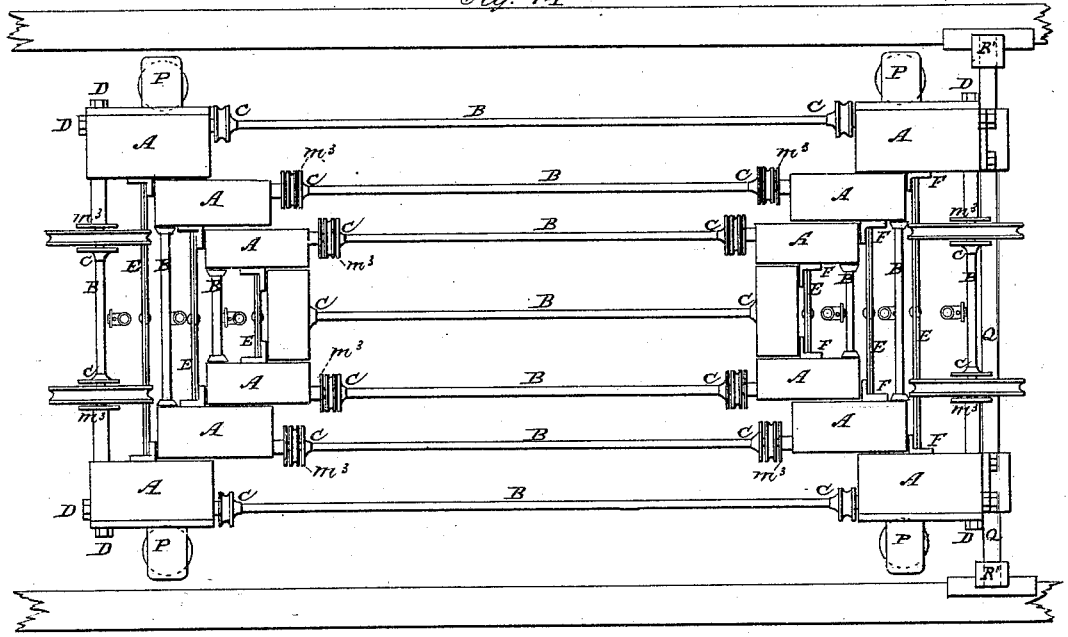
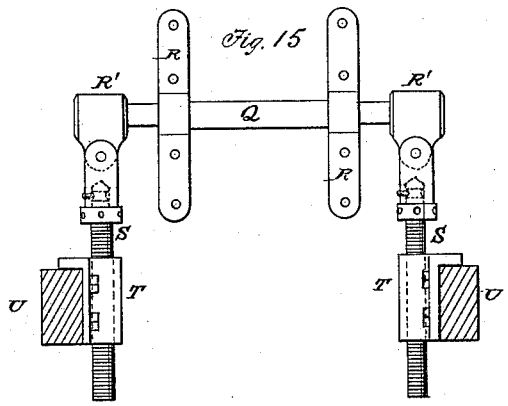
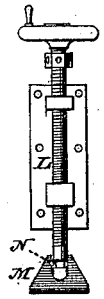
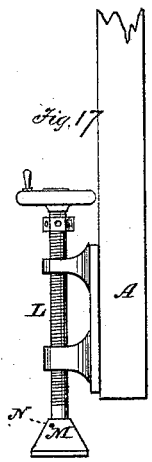

(No Model.) 7 Sheets—Sheet 6.
F. W. HOFELE.
Telescopic Ladder.
No. 232,968. Patented Oct. 5, 1880.
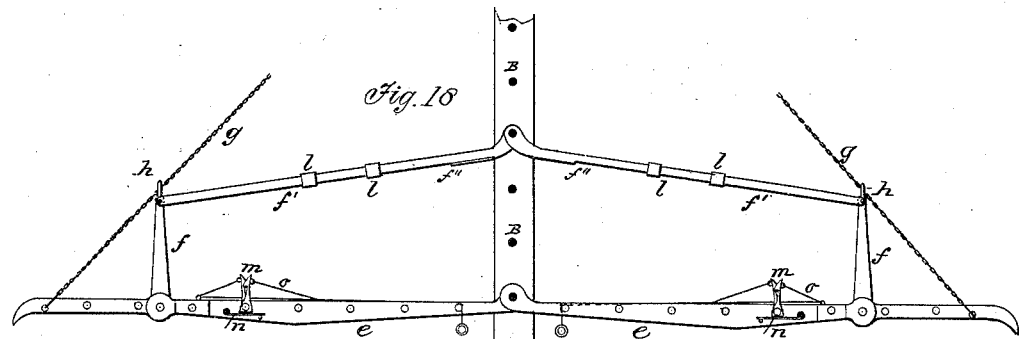
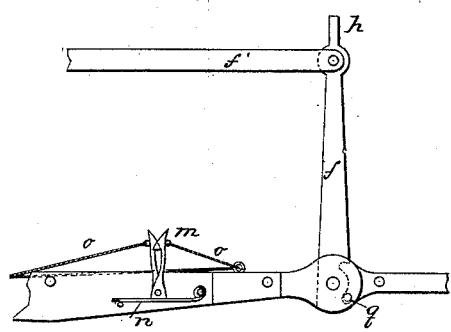
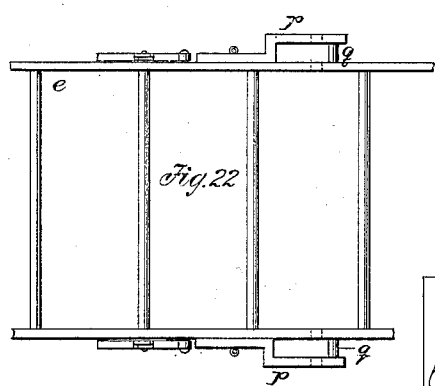
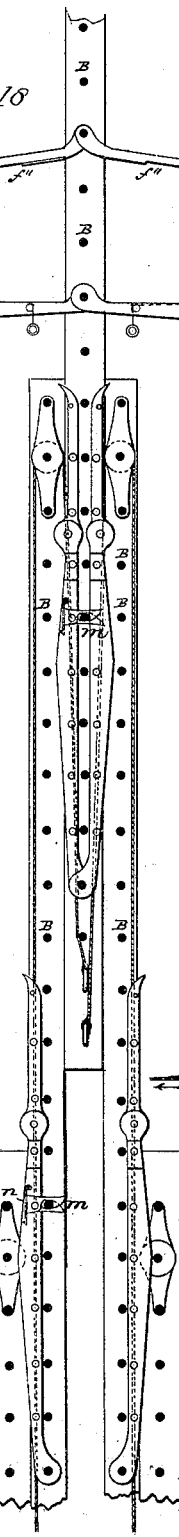
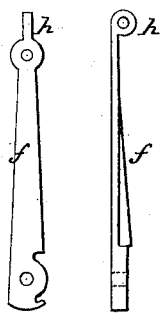
Witnesses:
T. W. Robertson
H. B. Robertson
Inventor
Ferdinand W. Hofele
per Charles H. Nash
Attorney (No Model.) 7 Sheets—Sheet 7.

F. W. HOFELE.
Telescopic Ladder.

No. 232,968. Patented Oct. 5, 1880.

Witnesses:
T. J. W. Robertson
A. B. Robertson

Inventor
Ferdinand W. Hofele
by Charles H. Nash
Attorney

N. PETERS, PHOTO-LITHOGRAPHER, WASHINGTON, D. C.

UNITED STATES PATENT OFFICE.

FERDINAND W. HOFELE, OF BROOKLYN, E. D., NEW YORK.

TELESCOPIC LADDER.

SPECIFICATION forming part of Letters Patent No. 232,968, dated October 5, 1880.

Application filed June 26, 1880. (No model.)

*To all whom it may concern:*

Be known that I, FERDINAND WILLIAM HOFELE, a citizen of the United States, residing at Brooklyn, E. D., in the county of Kings and State of New York, have invented certain new and useful Improvements in Telescopic Ladders, of which the following is a specification.

Figure 24:
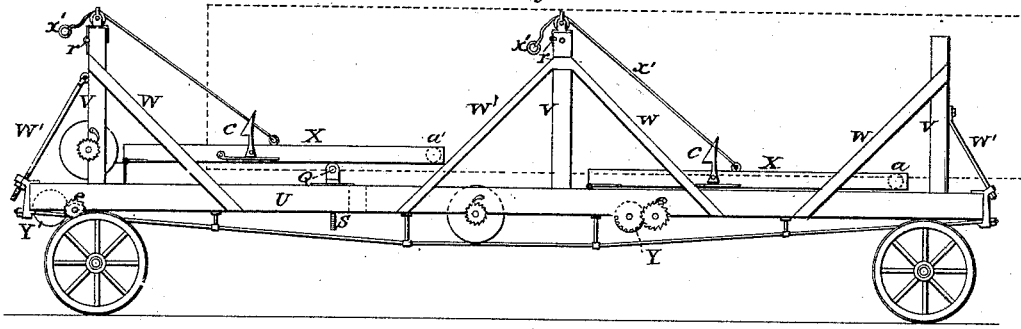
Figure 25:
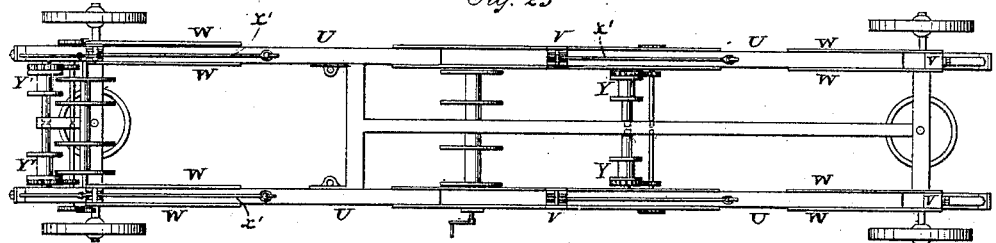
Figure 26:
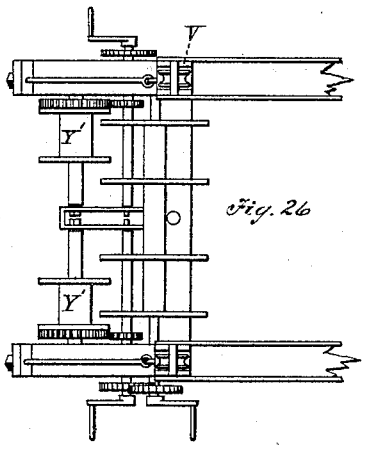
Figure 27:
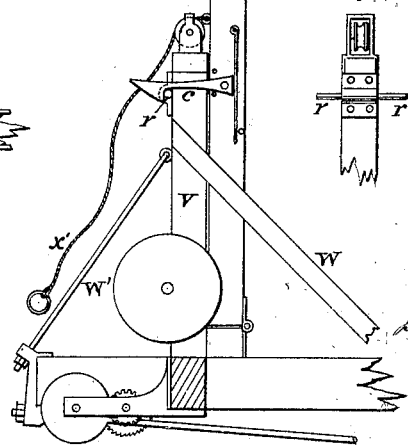
Figure 28:
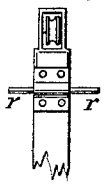
Figure 30:
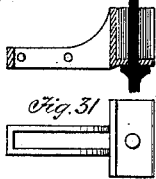
Figures 29, 31:
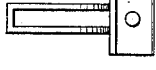

Figure 1, Sheet 1, represents a side view of a truck, showing the ladder raised in position and partially extended. Fig. 2, Sheet 2, is an enlarged side view of the first or lower section of ladder detached. Fig. 3 is an end view of the same, showing the hose in position. Fig. 4, Sheet 3, is an enlarged side view of the second section of ladder detached. Fig. 5 is an end view of the same, showing the hose in position. Fig. 6 is a detail view, showing the method of hanging the hose and the means of connecting the hose from one section to another. Fig. 7 is a detail plan of the hose-supporting rings. Fig. 8, Sheet 4, is an enlarged side view of the third or upper section of ladder detached, showing relative position of the folding ladders closed. Fig. 9 is an end view of the same, showing the position of the folding ladder when extended. Fig. 10 is an enlarged side view of one of the braces. Fig. 11 is an end view of the same; Fig. 12, a detail perspective view, illustrating more clearly the locking of the brace-sections. Fig. 13 represents the intermediate clamping-plate. Fig. 14, Sheet 5, is a plan showing the method of telescoping and hinge-connection of the ladder to the truck; Fig. 15, a detail end view of the combined hinge-connection and ladder-adjustment. Figs. 16 and 17 are detail views of the foot-screws of the ladder. Fig. 18, Sheet 6, is a sectional end elevation, showing the position of the folding ladders. Fig. 19 is an enlarged view, showing the connection of the folding check-post to its ladder. Figs. 20 and 21 are detached views of the check-post. Fig. 22 is a plan showing a portion of the folding ladder with check-post removed. Fig. 23 is an enlarged view of the hooks for locking the folding sections to the rings of the extension-ladder. Fig. 24, Sheet 7, is a side view of the truck, showing the ladder folded down in dotted lines. Fig. 25 is a plan view of the same. Fig. 26 is an enlarged detail plan of the front end of the same. Fig. 27 is a detail sectional side view of the forward end of the truck, showing one of the elevating-posts raised and locked in position. Fig. 28 is an end view of the top of one of the elevating-posts. Fig. 29 is an end view of the top of one of the fixed uprights. Fig. 30 is a sectional view of bracket for supporting the inner ends of the hoisting-drum axles of the forward end truck. Fig. 31 is a plan of the same.

Similar letters of reference indicate corresponding parts.

This invention relates, first, to a continuous four-way telescopic ladder with a series of one or more folding sections pivoted to the rungs of the telescopic sections in such manner that any one or more of them may be extended outward on either side at any desired angle, so as to form a platform for the firemen to work upon, as well as to enable persons to pass to or from the ladder to the building from any window in its line with perfect safety; and, secondly, in a novel method of hinging the main section to the truck in such manner that the ladder can be adjusted to perpendicular or any desired angle by a simple means provided for altering the line of its shaft; thirdly, in the manner of constructing and applying the adjustable swinging braces and foot-screws, respectively, upon the upper and lower extremities of the main section of ladder, so that when raised to position for extending the weight of the entire ladder may be relieved from the truck and stand on its own bottom, and the braces extending outward at any requisite angle from the top of the main section insures perfect steadiness to the said section; fourthly, in the peculiar arrangement of the fixed and hinged uprights, in combination with the independent-acting drums and ropes for elevating and lowering the ladder to the first position upon the truck.

In the case here presented each section of my ladder, with the exception of the top, consists of four posts, A A A A. Each set of four of these posts is held parallel in the most rigid manner possible by having all the rungs B made or provided with collars C, which abut against the inner side of the posts, and, the extremities of said rungs passing through the posts with nuts D screwed thereon, it is impossible for any rung to get out of place or for the ladder to warp; and to further prevent the possibility of warping or springing of any part of the sections, I have a series of cross-braces, E, extending from top to bottom of each section. These cross-braces, which are preferably made of metal, are riveted to the angle-irons F, which extend the full length of each ladder-section. These angle-irons are bolted to the sides of the posts A, and form ways for the movement of the sections, as clearly shown in Fig. 14, Sheet 5.

The hoisting-drum G is situated at the lower end of the main section, and is journaled between the cross-braces H. This drum has a large gear-wheel, I I, on each extremity of its axis, which mesh in pinions J J, as shown in Figs. 1, 2, and 3, to which the cranks K K are affixed.

Upon the lower end of each of the posts of the large main section there is a foot-screw, L, attached, the foot M consisting of a broad base of any desired shape, the lower end of the screw being rounded, so as to bear in a socket in the shoe, and secured thereto by a pin, N, which passes through the shoe and the neck of the screw, so as to allow the shoe to have sufficient play to adjust itself to any ordinary unevenness of ground.

Upon the sides of the posts of the main section, at their upper extremities, four extension-braces, O, are attached by a ball or universal joint, P, so that they may be swung outward at any angle to afford a broad base for the support of the ladder at as high a point upon the main section as possible. I have shown two different forms of such a joint—viz., that shown in Figs. 1, 2, and 3, which is essentially the same as what is known as the "Hooke" universal joint, and the style shown in Figs. 10 and 11, which I prefer to use, and which is a modification of the ball-and-socket joint. This joint consists of a wedge-shaped block, Q', having a recess in its lower end to receive the ball P, which is held in the recess in the block Q' by the strap P', which also is recessed to securely hold the ball. Through a hole in this strap, made large enough to allow considerable play, is passed a pin from the hemisphere S', which is screwed into the ball P. The bottom of the hemisphere bears against the plate P⁴, and below it is a lug passing between ears on the top of the brace O, and connected thereto by a pin. These braces are made in two sections, and have their faces ribbed or notched to match, so that when clamped together, as shown in Figs. 10, 11, and 12, there will be no possibility of slipping.

The clamps of the brace-sections O consist of screws s, with pulley-heads t, which extend through the runners u and bear upon the plate v' in clamp u; but in the other clamps the screw bears on the brace O. Between the brace-sections, at each clamp u, is a plate, v, whose face is ribbed or corrugated to match the face of the brace O.

w w w are endless ropes, which have a single turn around the pulley-heads, so as to give a sufficient gripe to manipulate them.

The center clamp is movable in order that it may be shifted to a central position between the other two clamps. For this purpose there is an eye, x, on the clamp-runner u', to which the rope y is attached. (See Figs. 10 and 11, Sheet 4.) This rope extends upward through an eye, z, in the upper clamp, and from thence down to the ground. This rope simply serves to draw the central clamp upward, its own weight being sufficient to bring it down when the clamp-screw is released. The aforesaid lower section of ladder, constituting the main section, is hinged to the truck by the shaft Q, the said shaft passing through two bearing-plates, R R, which are securely attached to the posts by having rings pass through the said posts and bearing-plates. The outer ends of the said shaft are supported in bearings R', which are pivoted to the heads of the leveling-screws S S. These leveling-screws run through the bosses T T, which are made with flanges, so as to hang upon the truck-frame U, as shown in Figs. 1, 3, 14, and 15, and thereby relieve the strain on the bolts which hold the same in position. The object in thus having the shaft affixed to the main sections of the ladder and supported in leveling-screws is to enable the ladder to be set perpendicular prior to extending the section.

The second and third sections are made in precisely similar manner, but smaller, and have all their nuts countersunk, so that they may telescope one within the other in succession. The top section, however, is made as a single ladder, but its rungs are made in like manner to those previously described; and to strengthen this upper section and to insure against any possibility of snapping or burning, I sheath the outer surface on two sides, A A, as shown in Fig. 9. Upon each section of ladder I have one or more folding ladders pivoted in duplicate upon the rungs, so as to fall in opposite directions. These folding ladders consist of a continuous ladder, e, with folding check-posts f and folding hand-rails f', and also a safety-chain, g, extending from the extremities of the said ladder through the eyes h on the tops of the check-posts, thence following upward in a straight line, as shown in Figs. 9 and 18, over the rungs of their respective sections, thence through an eye, i, shown in Fig. 9, and terminating with a hook, j, which is designed to catch upon any rung according to the inclination at which it may be necessary to hold the ladder.

It will here be noticed that there is a ball, k, on the chain below the eye i, which is situated so that it will strike the eye but not pass through simultaneously with the coming in contact of the slide-stops l on the rail. Consequently the said folding ladders cannot drop downward even should the wall of the building fall. The said folding ladders are provided with duplicate catches $m\ m$, arranged in a single pivot, so that one spring, $n$, bearing against both their bases, as shown in Figs. 18, 19, and 23, it will be impossible for both to be unshipped from their hold upon the rung over which they engage without drawing the cord $o$, which is designed for such purpose. These folding ladders are purposely made deeper at the center than at their ends, so that in ascending or descending the swell on the sides at the center will bear against the rungs of the adjacent sections and cause the aforesaid spring-catches to snap over the rung of its own section, and thereby prevent any possibility of the points at the extremity of the said ladders catching in the rungs of the adjacent section.

The check-post $f$ is made broad and flat at its base, and fits snugly between the ladder and the plate $p$, to which it is pivoted.

$q$ is a pin, which acts as a stop for the post to hold it in vertical position when the ladder is extended, and when closed the said pin acts as a check to keep the folded arm parallel with the ladder. The truck upon which the aforesaid ladder is hinged consists of two longitudinal string-pieces, U, well and securely braced together upon the upper side of each of the said string-pieces.

There are three stationary upright posts, V, held rigidly in position by the braces W W', so as to form rigid standards for the long hinged posts X X to bear and hold against in the act of raising or lowering the folded sections to or from the first position, said hinged posts being elevated by the ropes $x'$.

Y Y' are independent-acting drums, to which the rope or chains Z Z' are attached. These ropes or chains extend therefrom up over their respective pulleys $a\ a'$ on top of the hinged posts X X, and are secured to eyes $d\ d'$ on the main ladder. The said hinged posts are all provided with a double spring-catch, $c$, (similar to those previously described,) and which engage over a rigid projecting bar, $r$, situated on the fixed post, as shown in Figs. 24, 27, and 29. The aforesaid drums Y Y' for hoisting the ladder to position for extending all act independent of one another, so that all the lines may be kept taut while elevating to the first position.

Each section of ladder carries its own pipe or hose, the hose being suspended by an eye, $a^2$, from a cross-bar, $b^2$, and is supported at intervals by the couplings $c^3$, which are rigidly attached to the hose, and which simply rest upon the gimbal-ring $d^3$, the hose being free to draw upward with shrinkage from expansion when a heavy force of water is on, so as to relieve the strain on the ladder. I have as many of these hose-connections $c^3$ as there are folding ladders, and have the same housed between the rungs of the ladder-sections, so that they are not in the way of persons going up or down the ladder; and in addition thereto, at intervals on the hose corresponding with the average distance apart of the floors of a house, I have a series of T-couplings to connect the hose to play on the different floors.

$g^3 g^3$, Fig. 1, represent counter-weights, whose supporting-ropes are attached to eyes at the lower extremities of the second section and pass over the pulleys $i^3$, so as to cause the said weight to hang back of the rungs of the main section, as shown in Fig. 1.

At Y³ Y³ I have shown hose-reels, but make no claim thereto.

All the pulleys at the tops of the ladder-sections over which the hoisting-lines are intended to travel are supported on three rungs by having the rungs pass through plates $m^3$ and the center rung carrying the pulley, as shown in the drawings.

The ropes for hoisting the ladders perpendicularly have, for the sake of clearness, been left out of the drawings in most of the figures, as I make no claim to them, nor to the devices for winding them up, as they are of the kind commonly used, the only difference being that I use more ropes for greater security, one being employed at each corner of the ladder.

$j^3\ j^3$ are eyebolts, which pass through the bar $k^3$ at the base of the main-ladder section, with nuts $l^3$, the object of which is to enable any slackness of rope to be taken up by screwing up the nuts $l^3$.

The operation is as follows: The first move is to arrange the truck by elevating the hinged posts X and locking them in perpendicular position against the fixed upright V. The ladder is then raised from the rear of truck to an angle of about thirty degrees (more or less) by winding the rope on the drum Y, and upon reaching this height the weight of the said ladder is relieved from the first rope and raised to an upright position by the second rope, Z', which leads from an eye on the main-ladder section and passes over pulleys on the upper extremities of the forward posts and winds on the drums Y' of the forward end of the truck. This having been done, the next step is to adjust the shaft Q, upon which the main section of ladder hinges, so as to level the same, and thereby set the ladder in true perpendicular. The foot-screws at the bottom of the ladder are now to be run down to the ground, so as to form a solid bearing on its own base, and thereby relieve the strain from the truck. The braces O are now swung outward and extended to the most advantageous positions to afford stiffness to the section in giving as broad a base as possible by extending from the top of the main section of ladder. The ladder having thus been elevated to position, leveled, and braced, it is now ready to be extended perpendicularly. This is done by operating the cranks K, which turn the main drum, around which the hoisting-ropes wind. This drum is divided into four sections, so that the hoisting-ropes, of which there are four, may not overlap or interfere with each other, said ropes being attached to the eyes M' at the bottom of the second section, and run upward over pulleys N' on the top of the first section, and down on the sides and around pulleys $e^3$ on the bottom of the first section, to the drum G.

The small folding ladders will not fall outward to position until their catches have been released from the rung over which they engage. These ladders are provided with a small rope, which extends from the catch, so that by pulling any one or more of them when the ladder is extended any one or all of them may be caused to fall outward, as shown in Fig. 18, and when lowering the ladder the small ladders all fold within their respective sections. The shoulder $f''$ on the under side of the rail, coming in contact with the slide $l$, serves to fold the check-post down parallel with the small section.

I make no claim in this application to the combination of the diagonal braces with the angular posts of a double or fourfold ladder, as this feature forms the subject-matter of a separate application.

I am aware that a four-way ladder is not new, and that the use of ties or rods having shoulders and nuts to secure parts together is also old, that the different sections of an extension-ladder have been provided with separate pipes connected by couplings for carrying water, that angle-irons have been used on ladders, and that gimbals have been used for supporting many different objects, and I therefore lay no claim to any of these, broadly.

What I claim as new is—

1. The combination, in a fire-escape, of a truck and two or more continuous four-way ladders, each consisting of four posts, A A A A, all connected together by rungs B, having shoulders C on the inner sides of the posts and nuts D on the outer ends, whereby the four posts are strongly braced together, substantially as described.

2. The four-way ladder herein described, consisting of four posts, A, oblong in cross-section, and having an angle-iron, F, on each post, said angle-irons being arranged in pairs and facing each other on or near the middle of one of the broad sides of the posts, and being adapted to guide an interior ladder-section, diagonal braces secured to said angle-irons, and uniting-rungs connecting the posts at such distance from the angle-irons as to leave a space between the braces and rungs for the housing of the hose, substantially as specified.

3. The combination, with the ladders, of the angle-irons F and diagonal braces E, substantially as and for the purpose specified.

4. The combination, with the truck and ladder of a fire-escape, of the fixed uprights V, swinging posts X, and a fastening, C, substantially as described.

5. The combination, with the truck and ladder of a fire-escape, of the upright V, swinging post X, hook $c$, pin $r$, rope, and pulley $x'$, substantially as and for the purpose specified.

6. The combination, with the truck and fire-escape, of the ladder A, pivoted thereto, the uprights V, swinging posts X, ropes or chains Z Z', and drums Y Y', substantially as described.

7. The combination, with the posts of a ladder, of a series of rungs and a series of diagonal braces, whereby the ladder is stiffened and a space formed to hold and protect the hose-pipes, substantially as described.

8. The combination, with the truck and ladder of a fire-escape, of the swiveled bearings R' and leveling-screws S, substantially as and for the purpose specified.

9. The combination, with a truck and ladder, of the bosses T, screws S, swiveled bearings R', shaft Q, and bearing-plates R, substantially as described, and for the purpose set forth.

10. The combination of the brace O, clamp $u$, screw $t$, having a pulley-head, with the rope $w$, substantially as described.

11. The combination, with the brace O, of the fixed clamps $u$ $u$, sliding clamp $u'$, eye $z$, and rope $y$, substantially as and for the purpose specified.

12. The combination, with the ladder A, of the strap P', ball P, block Q', and hemisphere S', having a pin screwed into ball P and a lug pivoted to the head of the brace O, substantially as described.

13. The combination, with a vertical ladder, of the horizontal extension-ladder $e$, check-post $f$, extension-rail $f'$, and chain $g$, substantially as described.

14. The combination, with a vertical ladder, of the horizontal extension-ladder $e$, having stop $q$, pivoted and notched check-post $f$, extension-rail $f'$, having slides $l$ $l$ and shoulder $f'''$, chains $g$, eye $i$, ball $k$, and hook $j$, substantially as described.

15. A ladder provided with a folding platform and extension-rail, having slides $l$ $l$, both being hinged on rungs of the ladder, substantially as described.

16. The combination, with a ladder, of the folding platform formed of two ladder-sections, $e$ $e$, and adapted to fold up against the sides of the main ladder, and arranged on opposite sides of the ladder to counterbalance each other, substantially as described.

17. The combination, with the ladders $e$, of the pivoted hooks $m$, spring $n$, and cords $o$ $o$, substantially as and for the purpose specified.

18. The combination, wtih a ladder having two or more sets of rungs, of a ladder provided with a single set of rungs, and having hinged thereto a folding platform, $e$, which closes up automatically parallel with the single ladder as said single ladder descends within the outer ladder, substantially as described.

19. The combination, with a truck and swinging ladder, of a series of adjusting-screws, L, attached directly to the foot of the ladder and adapted to bear on the ground, whereby the pressure on the bearings R' is relieved and the weight of the ladder and its load is removed from the truck, substantially as described.

20. In combination with an extension-ladder, a series of pipes united together by T-couplings $c^3$, and supports for said couplings, each of said supports consisting of a ring, $d^3$, supported by pivots in another ring, $p^3$, having bearings at right angles to the pivots of the ring $d^3$, and mounted in the ladder-posts, substantially as and for the purpose set forth.

21. The combination, with a ladder, of a pipe-supporter hung on pivots on the ladder, substantially as described.

22. The combination, with an extension-ladder, of the plates supported on three rungs of said ladder and a pulley mounted on one of said rungs, substantially as and for the purpose specified.

FERDINAND WM. HOFELE.

Witnesses:
CHARLES H. NASH,
T. J. W. ROBERTSON.